United States Patent
Hempson et al.

(10) Patent No.: US 8,508,730 B2
(45) Date of Patent: Aug. 13, 2013

(54) QUALITY ASSURANCE OF A SOLID-STATE ILLUMINATION SOURCE

(75) Inventors: Kevin Hempson, Los Gatos, CA (US); Dilip Sangam, Saratoga, CA (US)

(73) Assignee: Atmel Corporation, San Jose, CA (US)

( * ) Notice: Subject to any disclaimer, the term of this patent is extended or adjusted under 35 U.S.C. 154(b) by 178 days.

(21) Appl. No.: 13/016,935

(22) Filed: Jan. 28, 2011

(65) Prior Publication Data

US 2012/0194816 A1 Aug. 2, 2012

(51) Int. Cl.
*G01J 3/28* (2006.01)

(52) U.S. Cl.
USPC .......................... 356/326; 356/121

(58) Field of Classification Search
USPC ................ 356/326, 121, 229, 448; 250/205, 250/206, 216, 226; 315/149, 312, 152; 345/102
See application file for complete search history.

(56) References Cited

U.S. PATENT DOCUMENTS

| | | | |
|---|---|---|---|
| 8,021,021 B2 * | 9/2011 | Paolini | 362/253 |
| 8,220,971 B2 * | 7/2012 | Harbers et al. | 362/294 |
| 2010/0277097 A1 * | 11/2010 | Maxik | 315/294 |
| 2011/0309754 A1 * | 12/2011 | Ashdown et al. | 315/151 |
| 2012/0038363 A1 * | 2/2012 | Morrow et al. | 324/414 |

OTHER PUBLICATIONS

JJL Technologies, "JJL Technologies Value-Optimized Spectral Sensing—Custom Abridged Spectrometers—custom Portable Spectrophotometers", JJ Technologies Brochure, 4 pages.

* cited by examiner

*Primary Examiner* — Layla Lauchman
(74) *Attorney, Agent, or Firm* — Fish & Richardson P.C.; Kirk Gottlieb (57) ABSTRACT

System(s), apparatus(es), and method(s) are provided for control of quality of light emitted from a group of solid-state light (SSL) sources that are part of an illumination fixture. The control is based at least in part on regulation of the spectral power distribution (SPD) of the light to match a SPD of a reference light source. A spectroscopic analyzer collects electromagnetic (EM) radiation emitted from the group of SSL sources and EM radiation substantially emitted from the reference light source. A first controller analyzes spectroscopic data related to SPDs of the group of SSL sources and the reference light source and, based on the analysis issues a configuration of the group of SSL sources. Implementation of the configuration causes the group of SSL sources to emit EM radiation with a SPD that nearly matches the SPD of the EM radiation substantially emitted from the reference light source.

23 Claims, 7 Drawing Sheets

QUALITY ASSURANCE OF A SOLID-STATE ILLUMINATION SOURCE

TECHNICAL FIELD

The subject disclosure relates to illumination sources for lighting systems and, more specifically, yet not exclusively, to controlling the quality of light emitted from solid-state lighting source(s).

BACKGROUND

Solid-state lighting affords color mixing of two or more light sources to generate the ocular perception of light with certain requirements. Such color mixing enables emulation of a light with a set of specified colorimetric values, or a "correlated color temperature." Although the set of specified colorimetric values or the correlated color temperature may be similar to an incandescent lamp, the spectrum of emitted electromagnetic (EM) radiation is significantly different from that of the incandescent lamp. When an illumination source generated through color mixing is utilized to illuminate an object, the perceived color of the object is a convolution of the EM radiation spectrum of the illumination source and the reflective properties of the object. In many scenarios, the spectrum of EM radiation emitted from a source of light composed through color mixing has one or more spectral region in which light emission is low or absent. Such one or more spectral regions may be caused to display non-negligible emitted light through incorporation of additional light source(s) into the source of light, where the additional light source(s) emit light in the one or more spectral regions. Such incorporation supplies extra channels (e.g., spectral regions of certain bandwidth) that contribute to smoothing the spectrum of the EM radiation emitted from the source of light; thus, causing the source of light to have suitable colorimetric values or correlated temperature.

The EM radiation spectrum resulting from color mixing and related illumination features may be controlled to reduce effects of temperature, manufacturing variations, aging, etc., of an active light source or an illumination fixture that utilizes at least the active light source. Such control typically is performed once at manufacture of the illumination fixture. In the alternative, and generally less often implemented, such control can be performed as an ongoing process built into the illumination device. Yet, as a result of metamerism, several solutions of illumination or colored object can exist that give the same visually perceived result. Thus, when an object is illuminated by a first source of light composed of light elements with narrow spectral features, the appearance of the object would differ significantly from the appearance resulting from illumination of the object with a second source of light composed of light elements having broad spectral features.

To overcome operational short-comings associated with color mixing, and metamerism, for example, conventional technologies adjust the quality of light by analysis of the spectral power distribution (SPD) originated in a composed source of light. However, in general, implementation of such approach via conventional technologies is an expensive solution since a high-resolution spectrometer is required to effect control of composition of the composed source of light—the high-resolution spectrometer is expensive due to providing good accuracy and calibration. Other factors also can hinder utilization or adoption of such solutions; for instance, in some scenarios, measurement and calibration of an illumination product (e.g., a luminaire or a lighting fixture) is performed at the time of manufacture, but it generally is impractical to conduct measurement and calibration as the illumination product ages.

SUMMARY

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts in a simplified form as a prelude to the more detailed description that is presented later.

One or more embodiments of the subject disclosure provide system(s), apparatus(es), and method(s) for controlling quality of light emitted from a group of solid-state lighting sources that are part of illumination systems. The control is based at least in part on regulation of the spectral power distribution (SPD) of the light to match a SPD of light emitted from a reference light source (e.g., ambient light) with a set of specified colorimetric values, or "correlated color temperature." A spectroscopic analyzer collects electromagnetic (EM) radiation emitted from the group of SSL sources and EM radiation substantially emitted from the reference light source. The spectroscopic analyzer includes, but is not limited to including, miniaturized optics integrated to a set of light sensors, and enables differential probe of spectral features of EM radiation. A first controller (or first controller component) analyzes spectroscopic data related to SPDs of the group of SSL sources and the reference light source and, based on the analysis issues a configuration of the group of SSL sources. Issuance of such configuration includes generation and delivery thereof. Implementation of the configuration causes the group of SSL sources to emit EM radiation with a SPD that nearly matches the SPD of the EM radiation substantially emitted from the reference light source. A second controller (or second controller component) acquires the configuration and implements it; implementation of the configuration includes operating the group of SSL sources in accordance with at least one control parameter based on the configuration.

Particular implementations may have one or more of the following advantages: (1) metamerism effects on color perception are mitigated inexpensively by reducing costs associated with deployment of high-resolution spectrometers and in-the-field calibration thereof; (2) collection of spectroscopic data in differential detection mode mitigates or avoids calibration of spectroscopic analyzer in the field; (3) such mode of collection of spectroscopic data automatically accounts for long-term variations of an illumination product or fixture including the group of SSL sources, and reduces effects on illumination features of manufacturing variations amongst two or more SSL source in the group of SSL sources; (4) such differential detection of EM radiation allows utilization of low-resolution optics, while maintaining acceptable performance of QA; (5) low-resolution optics largely reduces costs of adoption (capital expenditure (CAPEX)) and deployment (operational expenditure (OPEX)) of the QA system(s) described herein; and (6) the group of SSL sources need not be calibrated at manufacturing.

To the accomplishment of the foregoing and related ends, the one or more aspects include, but are not limited to including, the features hereinafter fully described and particularly pointed out in the claims. The following description and the annexed drawings set forth in detail certain illustrative features of the one or more aspects. These features are indicative,

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the various embodiments of the subject disclosure may be practiced without these specific details. In other instances, well-known structures and devices are shown in block diagram form in order to facilitate describing the subject disclosure.

Figure 1:
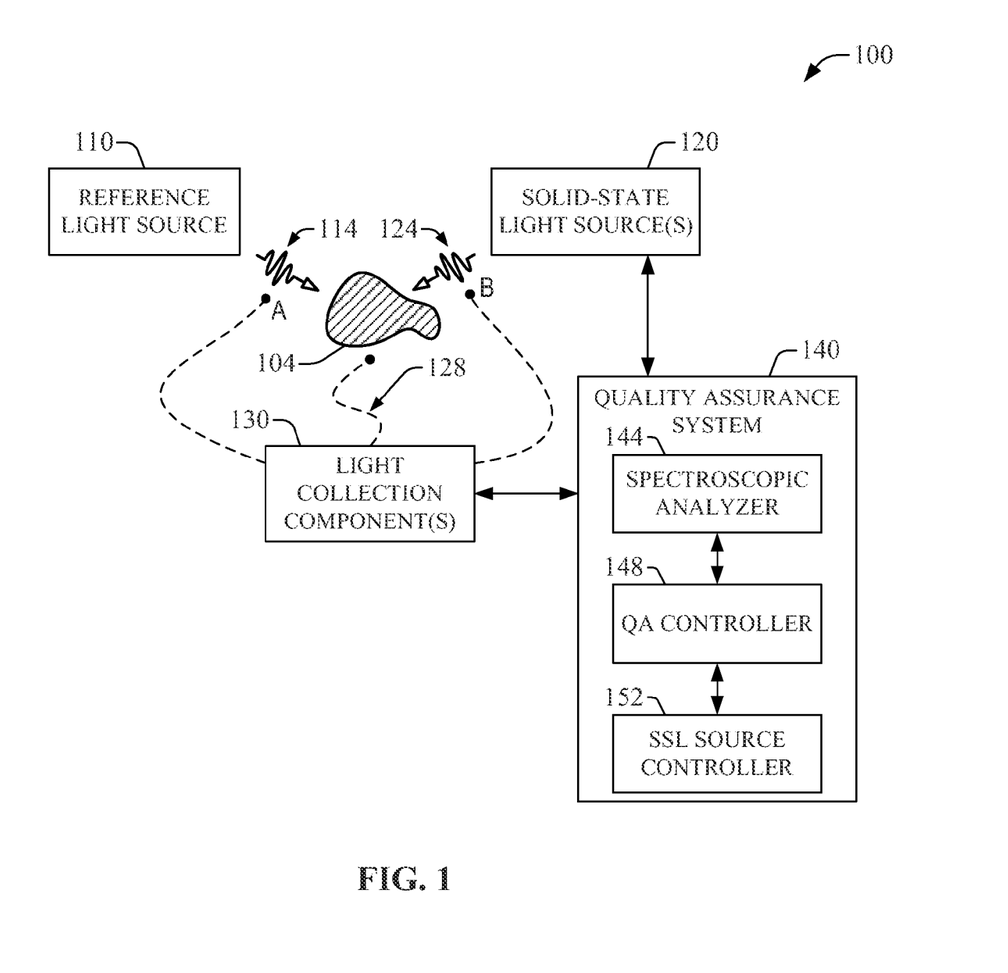
FIG. 1 displays an example system that enables and exploits quality assurance (QA) of light emitted from a group of solid-state light (SSL) sources in accordance with aspects of the subject disclosure.

With respect to the drawings, FIG. 1 displays a block diagram of an example system 100 that enables and exploits quality assurance of light emitted from a group of solid-state light (SSL) sources in accordance with aspects described herein. Quality assurance (QA) is accomplished, at least in part, through regulation the spectral power distribution (SPD) of the light. Example system 100 includes a group of one or more solid-state light source(s) 120, one or more light collection component(s) 130 and a quality assurance system 140. The group of solid-state light source(s) 120 can include, without limitation, a set of LEDs including, but not limited to including, conventional LED(s), organic LED(s), quantum-dot-based LED(s), and so forth; any of such LED(s) can be white LED(s); red (R), green (G), blue (B) (RGB) LED(s); LED(s) that can emit EM radiation at any or substantially any other color (purple, orange, violet, yellow, etc.), or a combination thereof. Generally, a light source in the group of one or more SSL source(s) 120 can be a substantially monochromatic emitter or a single emitter that excites at least one phosphor emitters, such as an incandescent lamp.

In example system 100, light 128 includes electromagnetic (EM) radiation emitted from a reference light source 110, EM radiation emitted from at least one solid-state light source of the group of the one or more solid-state light source(s) 120, and EM radiation that results from scattering (e.g., reflection) with one or more object(s) 104. Reference light source 110 serves, in part, as a source of environmental (or ambient) light; reference light source 110 is external to the group of one or more solid state light source(s) 120. Light 128 may also be collected by the one or more light collection component(s) 130, e.g., optical fiber link(s), collimator(s), shutter(s), or the like. The one or more light collection component(s) 130 can supply collected EM radiation to a spectroscopic analyzer component 138, also referred to as spectroscopic analyzer component 138 in the subject specification and annexed drawings. In certain implementations, the one or more light collection component(s) include distributed local collection points (indicated with dashed lines ending in a solid circle) that enable acquisition of EM radiation emitted substantially from the reference light source (see point A) and EM emitted substantially from the group of the one or more solid-state light source(s) 120 (see point B). By being distributed, the local collection points can mitigate or avoid interference amongst EM radiation emitted from reference light source 110, EM radiation emitted from the group of the one or more solid-date light source(s) 120, and EM radiation scattered off object 104.

Spectroscopic analyzer 144 includes a set of optics and a set of light sensors that generate signaling and related data indicative of spectral features of the collected EM radiation; the set of light sensors is integrated into the set of optics. Spectroscopic analyzer 144 conveys the signaling and the related payload data to a QA controller 148. In an embodiment of spectroscopic analyzer 144, e.g., example embodiment 200 shown in FIG. 2, the set of optics includes, but is not limited to including, two aperture stops 212, and a spectrometer 214 (e.g., a grating spectrometer, Fourier transform spectrometer . . . ); the spectrometer is a miniature spectrometer and includes at least two exit pupils. In such embodiment, the set of light sensors 230 can include photodiode(s), photomultiplier(s), charge-coupled device (CCD) camera(s), or the like. In an embodiment, the set of sensors are integrated into a substrate 220, which can be a semiconductor substrate (or wafer). At least one sensor in a set of sensors can be integrated into the semiconductor substrate through various IC semiconductor processing techniques. In alternative or additional embodiments, the substrate 220 is a plastic substrate. The set of light sensors 230 and the substrate 220 are integrated (e.g., connected, or manufactured in a single piece, or attached to form a single piece) through a solid slab 215; the solid slab 215 can be rigid or flexible and manufactured of a material that is effectively opaque to the EM radiation $218_1$ substantially emitted from the first light source and the EM radiation $218_2$ substantially emitted from the second light source.

Figure 2:
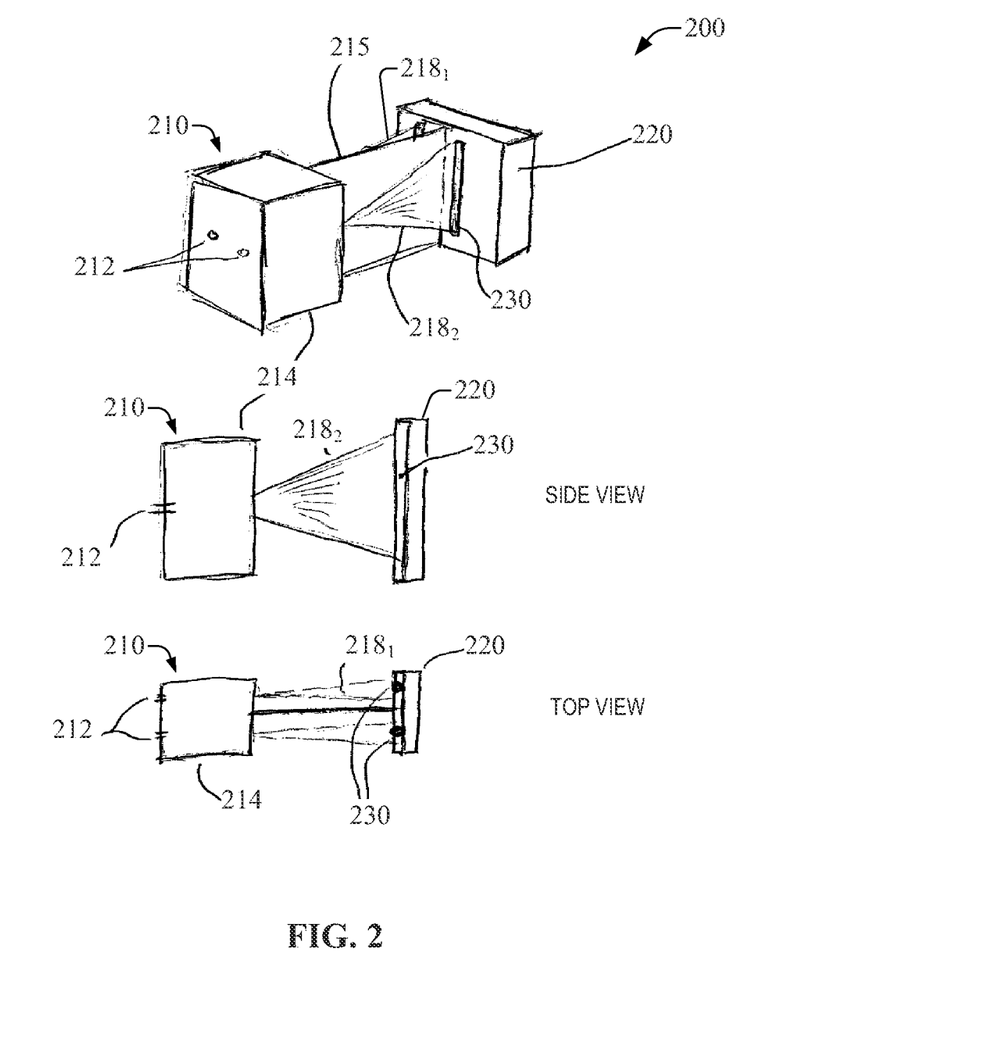
FIG. 2 presents an example embodiment of a spectroscopic analyzer in accordance with aspects described herein. The spectroscopic analyzer can be part of the example system depicted in FIG. 1.

In certain implementations, a first subset of one or more sensors of the set of sensors is embodied in a first pixelated semiconductor photodetector including, without limitation, N×M detection pixels, with N and M natural numbers. Likewise, a second subset of one or more sensors of the set of sensors is embodied in a second pixelated semiconductor photodetector including, without limitation, N'×M' detection pixels, with N' and M' natural numbers and N' substantially equal to N and M' substantially equal to M. The first pixelated semiconductor photodetector and the second pixelated semiconductor photodetector are integrated into a substrate (semiconductor substrate, plastic substrate, etc.). The N×M detection pixels span a first confined region in the substrate, and the N'×M' detection pixels span a second confined region in the substrate, wherein the second confined region covers a surface substantially the same as the surface covered by the first confined region. In an aspect, the first pixelated semiconductor photodetector is located within about 1 micrometer to about 100 micrometers from the second pixelated semiconductor photodetector.

In view of the specific arrangement of the set of sensors and light collection structure of the set of optics (e.g., two apertures, spectrometer, and exit pupils), spectroscopic analyzer 144 enables differential probe of spectral features of collected EM radiation (e.g., 218$_1$ and 218$_2$). In certain embodiments, at least an advantage of the differential detection of EM radiation is that the spectrometer in the set of optics 210 can be a low-resolution spectrometer. Low resolution largely reduces costs of adoption (e.g., CAPEX) and deployment (e.g., OPEX) of QA system 140. In such certain embodiments, or additional or alternative embodiments, at least another advantage of the differential detection is that the spectrometer in the set of optics 210 does not require calibration, as the first pixelated semiconductor photodetector is manufactured in proximity of the a second pixelated semiconductor photodetector and such photodetectors are substantially the same (or substantially replicated) accounting for the majority of or all the effects of systematic errors associated with generation of spectroscopic data for the reference light source 110 and the group of the one or more SSL source(s) 120. Moreover, in such certain embodiments, or additional or alternative embodiments, at least yet another advantage of the foregoing arrangement of the set of light sensors 230 with respect to conventional systems is that the numbers N×M and N'×M' can be low, e.g., O ($10^2$-$10^4$), as the first pixelated semiconductor photodetector is manufactured in proximity (e.g., within about 1 μm to about 100 μm) of the a second pixelated semiconductor photodetector.

In certain embodiments, the spectroscopic analyzer 144 can include an analog-to-digital converter (not shown) that enables the spectroscopic analyzer 144 to deliver digitized data. In the alternative, spectroscopic analyzer 144 can supply analog data and QA controller 148 can include the analog-to-digital converter (not shown) to produce digitized data from the analog data received from the spectroscopic analyzer 144.

QA controller 148 acquires (e.g., receives, retrieves) spectroscopic data, such as the signaling and related payload data generated by spectroscopic analyzer 144. Based on the spectroscopic data, QA controller 148 generates a first SPD related to EM radiation emitted from the group of the one or more SSL source(s) 120 and a second SPD related to EM radiation collected from the reference light source 110 (e.g., ambient light). In addition, QA controller 148 can compare the first SPD and the second SPD and determine (e.g., compute) a mismatch metric indicative of the spectral difference amongst the first SPD and the second SPD; the mismatch metric can be a scalar or a vector. For instance, a vector mismatch metric can be constructed by computing the difference amongst the first SPD and the second SPD for a set of spectral channels; a scalar mismatch metric can be derived from the vector mismatch metric through computation of the magnitude of the vector mismatch, for example. In an embodiment of QA controller 148, e.g., example embodiment 300 illustrated in FIG. 3, monitor component 320 can receive the signaling and related payload data as part of signaling 310; monitor component 320 also can generate the first SPD and the second SPD and compare them. Moreover, in such embodiment, monitor component 320 can determine the mismatch metric based on outcome of the comparison of the first SPD with the second SPD. To determine the mismatch metric, monitor component 320 can exploit method retained method storage 382.

Figure 3:
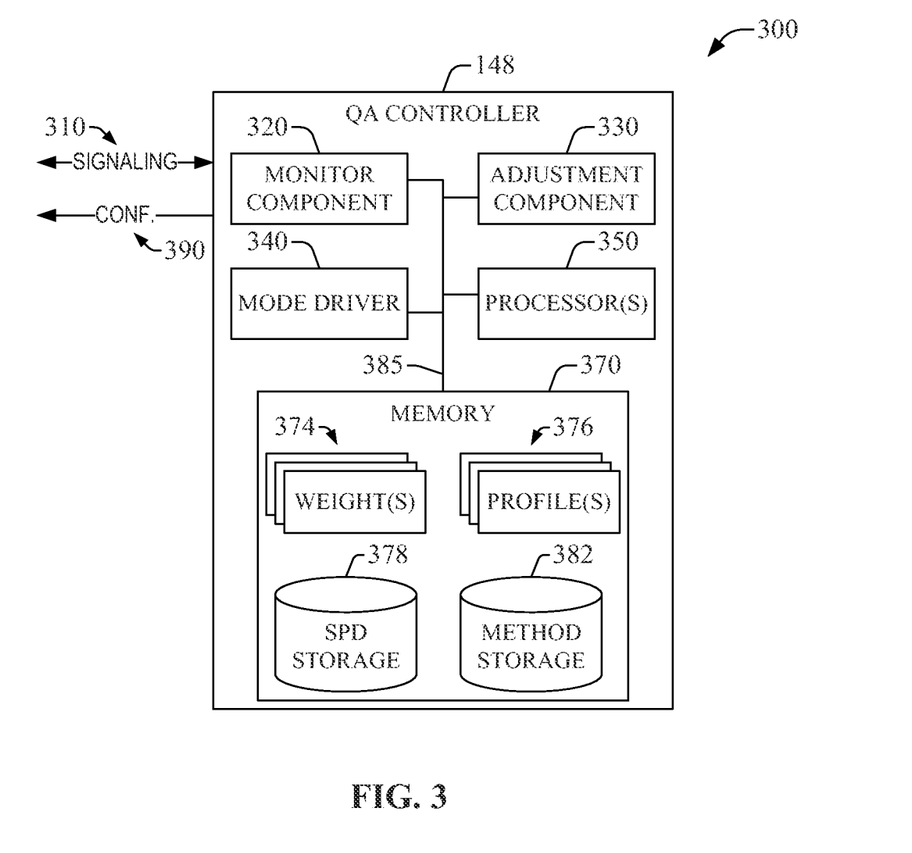
FIG. 3 depicts an example embodiment of a QA controller in accordance with aspects described herein. The QA controller can be part of the example system presented in FIG. 1.

Based at least on a value of a mismatch metric, QA controller 148 can adjust at least one parameter of at least one SSL source of the group of one or more SSL source(s) 120 in order to cause the value of the mismatch metric to be a suitable value. Suitability of the value of the mismatch metric can be established through at least one predetermined suitability criterion. A suitability criterion can be configurable. In certain implementation the adequacy criterion can be configured throughout the operational lifetime of the example system 100, whereas in other implementations the adequacy criterion can be configured when example system 100 is manufactured. QA controller 148 can convey the at least one parameter to a SSL source controller component 152, also referred to as SSL source controller 152. In certain embodiments, such as example embodiment 300, adjustment component 330 can adjust the at least one parameter of the at least one SSL source of the group of one or more SSL source(s) 120 as described previously. In addition, adjustment component 330 can deliver the at least one parameter as part of configuration (conf.) 390.

In QA system 140, and in response to receiving a parameter that controls spectral features of a SSL source of the group of one or more SSL source(s) 120, SSL source controller 152 can compose the group of one or more SSL source(s) 120 in accordance with the parameter in order for the SPD related to the group of one or more SSL source(s) 120 to match satisfactorily the SPD related to a reference light source 110. A satisfactory match is realized when a mismatch metric for the SSL source fulfills at least one suitability criterion. To perform such composition, QA system 140 can generate a profile for the SSL source, wherein the profile includes, but is not limited to including, (1) a first variable indicative of actuation of the SSL source, e.g., the first variable indicates if the SSL source is energized (or powered on) or de-energized (or powered off); and (2) a second variable indicative of intensity of light (e.g., EM radiation) to be emitted from the SSL source in a particular spectral channel (e.g., a portion Δν of the EM radiation spectrum) when the first variable indicates the SSL source if to be energized, the second variable also is referred to as a weight parameter or weight. At least one weight parameter can be derived from human spectral sensitivity curves, to reduce effects of errors due to disparate spectra of EM radiation of a first light source and a second light source. In certain embodiments, such as example embodiment 300, adjustment component 330 can generate the profile for the SSL source. To at least such end, adjustment component 330 can exploit, in part, a set of weights retained in one or more memory element(s) 374 (file(s), database(s), register(s), etc.). At least one weight in the set of weights can be derived from human spectral sensitivity curves. Adjustment component 330 can retain a profile in a set of one or more memory element(s) 376 (file(s), database(s), register(s), etc.).

In response to generation of a first profile, QA controller 148 initiates an acceptance phase, or acceptance loop, in which subsequent profiles (second profile, third profile, etc.) are generated iteratively until the SPD related to the group of the one or more SSL source(s) 120 to match satisfactorily the SPD related to a reference light source 110. In an aspect, initiation of the acceptance phase is a control event. In an embodiment, e.g., example embodiment 300, mode driver component 340 (or mode driver 340) can initiate the acceptance loop. As part of the acceptance loop, the first profile is conveyed to SSL source controller 152, which adjusts at least one control parameter that regulates EM radiation emitted from the group of one or more SSL source(s) 120. Adjustment of the at least one control parameter results in adjusted group of one or more SSL source(s) 120; as part of the acceptance loop, EM radiation emitted from the adjusted group of one or more SSL source(s) 120 is collected and provided to spectroscopic analyzer 144 as described in previous passages of the subject disclosure. Signaling and related data associated with spectral feature(s) of the EM radiation emitted from the adjusted group of the one or more SSL source(s) 120 is received by QA controller 148 and a subsequent profile is composed. In case the subsequent profile does not fulfill an acceptance criterion, an updated profile is composed and the acceptance loop continues. In the alternative, in response to acceptance of a profile of a SSL source that causes the group of the one or more SSL source(s) 120 to match satisfactorily the SPD related to a reference light source 110, the profile is retained in memory (e.g., memory 370 or a memory element therein).

At a time of or after acceptance of a profile, the profile is conveyed to SSL source controller 152, which can configure at least one source of light in the group of one or more SSL source(s) 120 in accordance with the profile. SSL source controller 152 can include, but is not limited to including, one or more of power sources, current sources, power converters (e.g., DC-DC boosters, AC-DC converters . . . ), regulation components, processor(s), and the like. In certain implementations, in a scenario in which a profile of the light source is not accepted in accordance with at least one acceptance criterion, QA controller 148 issues (e.g., generates and delivers) a report or configures indicia (e.g., a blinking light in a user-interface panel) indicative of failure to compose a profile according to specification. In example embodiment 300, adjustment component 330 can issue the report or configure such indicia. At a time of or after acceptance of a profile of a SSL source that causes the group of one or more SSL source(s) 120 to match satisfactorily the SPD related to a reference light source 110, the profile is retained in memory (e.g., memory 370 or a memory element 376 therein).

The adjustment, or configuration, of the group of SSL source(s) 120 can be effected in response to changes in temperature of the environment of object 104, changes in temperature of environment of the group of the one or more of SSL light source(s) 120, changes in operation condition(s) of the group of the one or more SSL light source(s) 120, or the like. In addition, such adjustment can be performed at certain instants (e.g., instants dictated by a schedule, wherein the schedule can be defined by end-user of the group of one or more SSL light source(s) 120) to account for wear and tear effects on at least one source in the group of one or more SSL light source(s) 120. The control logic is configurable and can be retained in a memory functionally coupled to QA system 140 or therein.

In certain embodiments, quality assurance system 140 can operate in learning mode. In an aspect, QA controller 148 can configure the QA system 140 to operate in learning mode; for instance, in example embodiment 300, mode driver 340 can configure the QA system 140 in learning mode. In such mode, the QA system 140 acquires spectroscopic data related to at least one SSL source of the group of the one or more SSL source(s) 120 and retains at least a portion of such spectroscopic data in a memory. In addition or in the alternative, in learning mode, the QA system 140 acquires spectroscopic data related to the reference light source (e.g., ambient source) and retains at least a portion of such spectroscopic data in the memory. QA system 140 exploits at least the portion of the spectroscopic data to compose the one or more SSL source(s) 140 to match satisfactorily at least one spectral feature of reference light source 110. In an implementation, QA system 140 can operate in learning mode in response to occurrence of a control event. For example, when the control event is deployment (e.g., installation and testing) of the at least one SSL source a lighting fixture that exploits the group of one or more SSL source(s) 120, QA controller 148 can operate in control mode and acquire EM radiation emitted from the at least one SSL source, and generates a SPD of such radiation. The SPD embodies the spectroscopic data and is retained in the memory. For another example, when the control event is first deployment (e.g., installation and testing) of the lighting fixture that exploits the group of one or more SSL source(s) 120, QA controller 148 can operate in control mode and acquire EM radiation emitted from the reference light source 110; the QA controller 148 can generate a SPD of such EM radiation and retain the SPD in the memory. In certain embodiments, e.g., example embodiment 300, monitor component 320 can acquire the EM radiation and generate the SPD thereof; monitor component 320 also can retain the SPD in SPD storage 378.

In example system 100, to implement the various features or aspects described previously, QA controller 148 can include or can be functionally coupled to one or more processor(s) (e.g., processor(s) 350). In addition, input/output (I/O) component(s) (not shown) can enable configuration of various registers and other values utilized in operation of QA controller 148. In an aspect, the one or more processor(s) (e.g., processor(s) 350) can enable or can be configured to enable, at least in part, the described functionality of QA controller 148 or one or more functional elements (e.g., component(s), generator(s), block(s), module(s)) therein. In an aspect, to provide such functionality, the one or more processor(s) (e.g., processor(s) 350) can exploit a bus architecture (e.g., bus 385) to exchange data or any other information amongst functional elements (e.g., component(s), controller(s), generator(s), blocks) within QA controller 148 and at least one memory (e.g., memory 370) functionally coupled to the QA controller 148 or therein. The bus architecture (e.g., bus 385) can be embodied in at least one of a memory bus, a system bus, an address bus, a message bus, a set of pins, or any other conduit, protocol, or mechanism for data or information exchange among components that execute a process or are part of execution of a process. The exchanged information can include at least one of code instructions, code structure(s), data structures, or the like.

The one or more processor(s) (e.g., processor(s) 350) also can execute computer-executable instructions (not shown) stored in the at least one memory (e.g., memory 370) to implement (e.g., execute) or provide at least part of the described functionality of QA controller 148. Such computer-executable instructions can include program modules, software applications, or firmware applications that implement specific tasks which can be accomplished, for example, through one or more of the methods disclosed herein and that are associated, at least in part, with functionality or operation of example QA system 140. In one or more alternative or additional embodiment(s), the one or more processor(s) (e.g., processor(s) 350) can be distributed amongst one or more functional elements (components, blocks, etc.) of QA controller 148.

In one or more embodiments, QA controller 148 can be either a general microcomputer or a special purpose microcomputer. QA controller 148 and other component(s) or functional element(s) can be implemented on a single integrated circuit (IC) chip or on multiple IC chips. ICs can include at least one processor, which can be part of the one or more processor(s) (e.g., processor(s) 350) referred to in previous passages of the subject disclosure. In embodiments including multiple IC chips, functional elements of QA controller 148 can be arranged in modules, wherein in each module is implemented in an IC. In addition, through provision of computer-executable instructions to a memory functionally coupled to the QA controller 148 or included therein, QA controller 148 can be programmable. In the alternative, QA controller 148 can be non-programmable and operate in accordance with aspects herein as established at manufacturing time. In a combined approach, certain features of QA controller 148 can be programmable while others can be non-programmable and preserved as provisioned at manufacturing time. QA controller 148 or one or more components therein can be implemented in hardware, software, or firmware.

In certain embodiments, solid-state light source controller 152 also can include at least one processor that operates in substantially the same manner as the one or more processors included in QA controller 148. As an example, by executing a set of one or more computer-executable instructions, the at least one processor can enable control of the group of one or more SSL source(s) 120 in accordance with aspects described herein.

In view of the example system(s) described above, example methods that can be implemented in accordance with the disclosed subject matter can be better appreciated with reference to flowchart in FIGS. 4-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein.

Methods disclosed throughout the subject specification and annexed drawings are capable of being stored on an article of manufacture to facilitate transporting and transferring such methods to computers, or computing devices, or chipsets, e.g., integrated semiconductor-based circuits, with processing capability(ies) for execution, and thus implementation, by at least one processor, or for storage in at least one memory. In an aspect, one or more processors that enact the methods described herein can be employed to execute computer-executable instructions (also referred to as computer-executable programming code instructions or computer-executable code instructions, or machine-executable instructions) retained in a memory or any computer-readable or machine-readable storage medium, in order to implement the methods described herein. The computer-executable instructions, when executed by the one or more processors, cause the one or more processor to implement or perform the various acts included in the example methods disclosed herein. The machine-executable or computer-executable instructions provide a machine-executable or computer-executable framework to enact (e.g., execute) the method(s) described herein.

Figure 4:
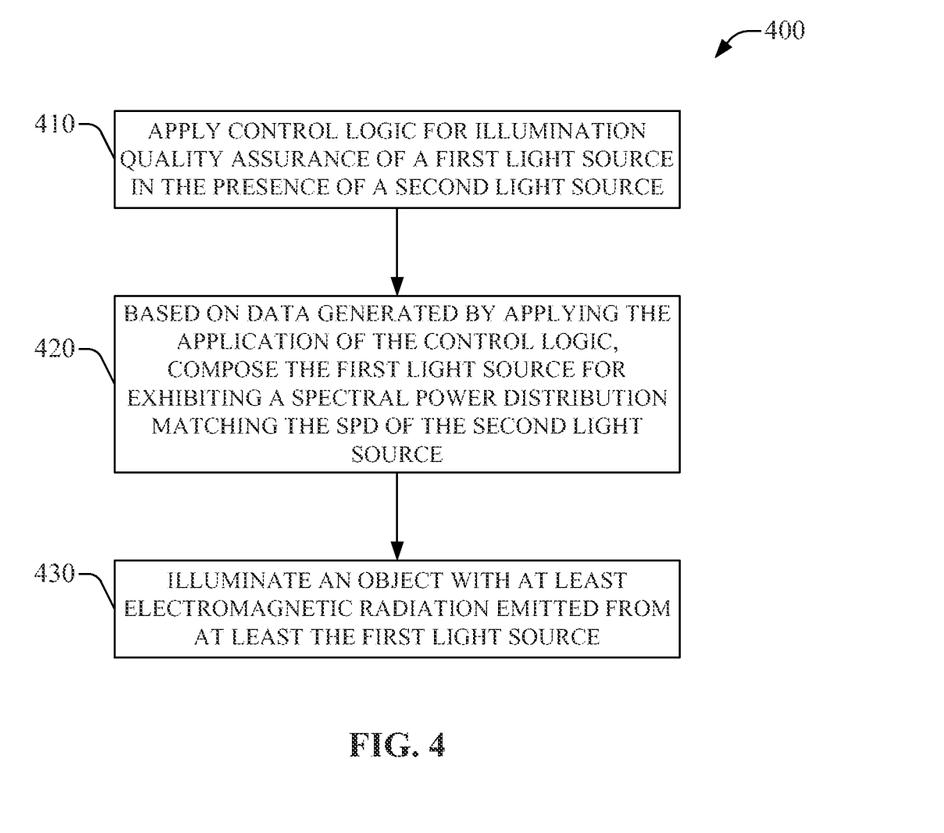
FIG. 4 illustrates an example method for controlling the quality of illumination of an object according to aspects described herein.

FIG. 4 presents a flowchart of an example method 400 for controlling the quality of illumination of an object (e.g., object 104) according to aspects described herein. Such controlling is based at least on spectroscopic features of EM radiation substantially emitted from a reference light source and an active light source utilized to illuminate the object. In certain embodiments, as indicated in previous passages of the subject disclosure, the active light source (a light source of the group of the one or more SSL source(s) 120) is a multi-channel solid-state lighting source including, without limitation, a set of LED-based lamps. As described previously, a channel in the multi-channel solid-state lighting source spans a portion $\Delta\nu$ of the spectrum of EM radiation. In an aspect, a group of channels in the multi-channel solid-state lighting source can belong to a single light source, e.g., LED emitting in a portion of visible EM radiation spectrum. At act 410, control logic for illumination quality assurance of a first light source (e.g., the active light source) in the presence of a second light source (e.g., reference light source). At act 420, based on data generated by applying the control logic, the first light source (e.g., the active light source) is composed to match a spectral power distribution (SPD) of the second light source (e.g., reference light source). At act 430, an object is illuminated with EM radiation emitted from at least the first light source (e.g., the active light source).

Figure 5:
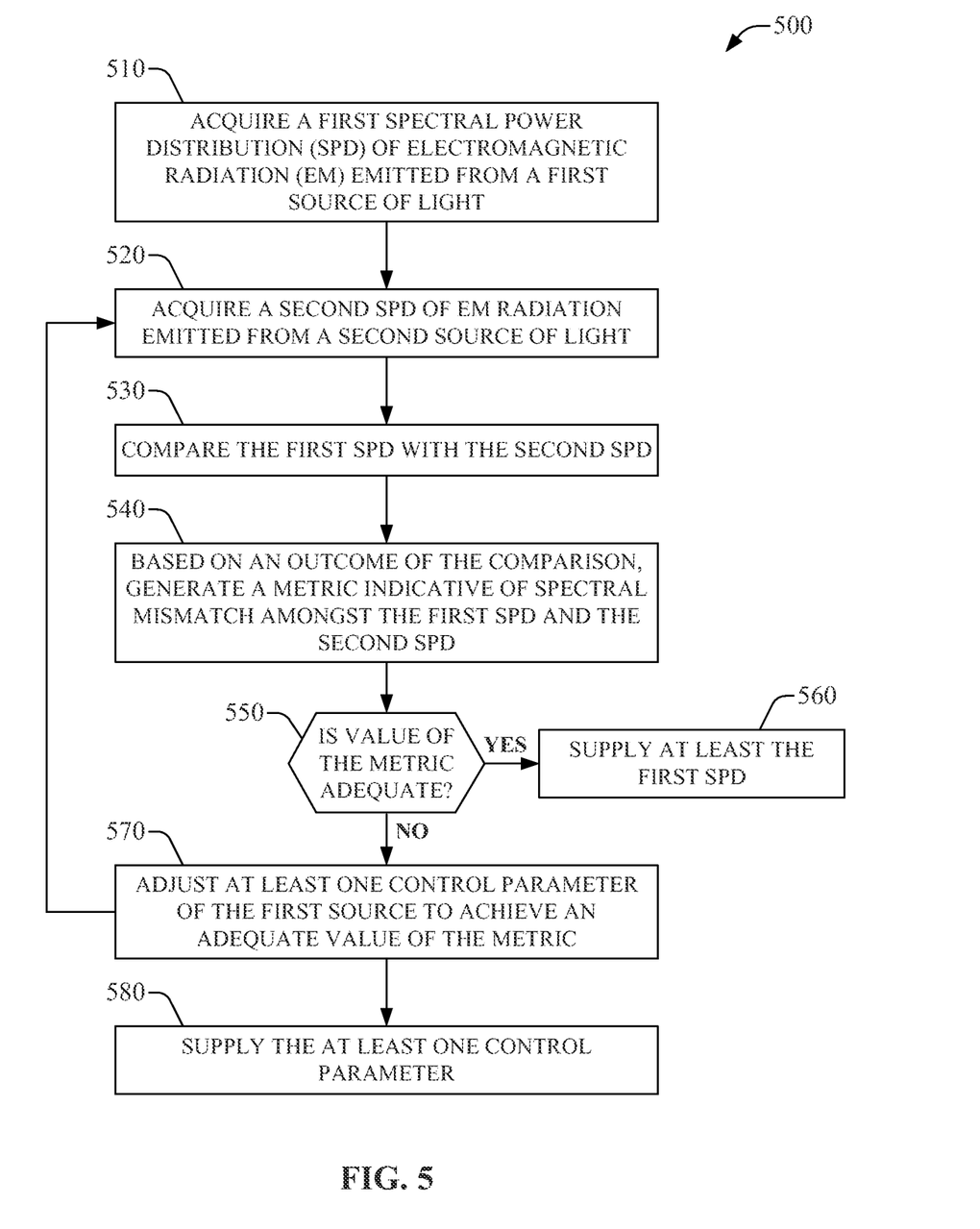
FIG. 5 illustrates an example method for applying control logic for dynamically controlling quality of illumination of an object according to aspects described herein.
Figure 6:
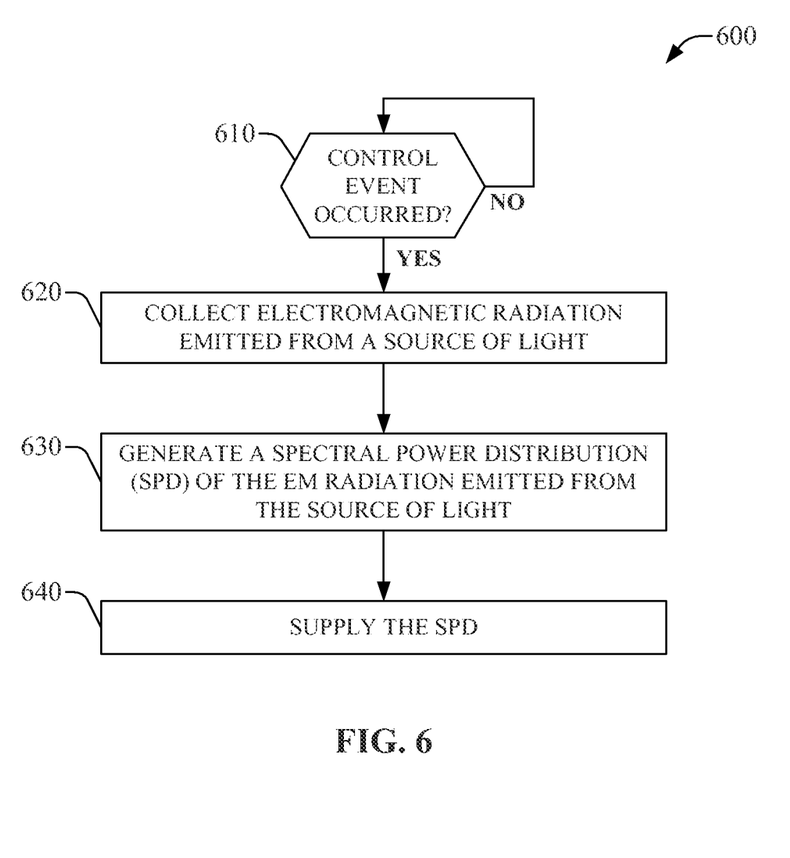
FIGS. 6-7 present example methods for collecting information related to spectral features of a source of light according to aspects described herein.
Figure 7:
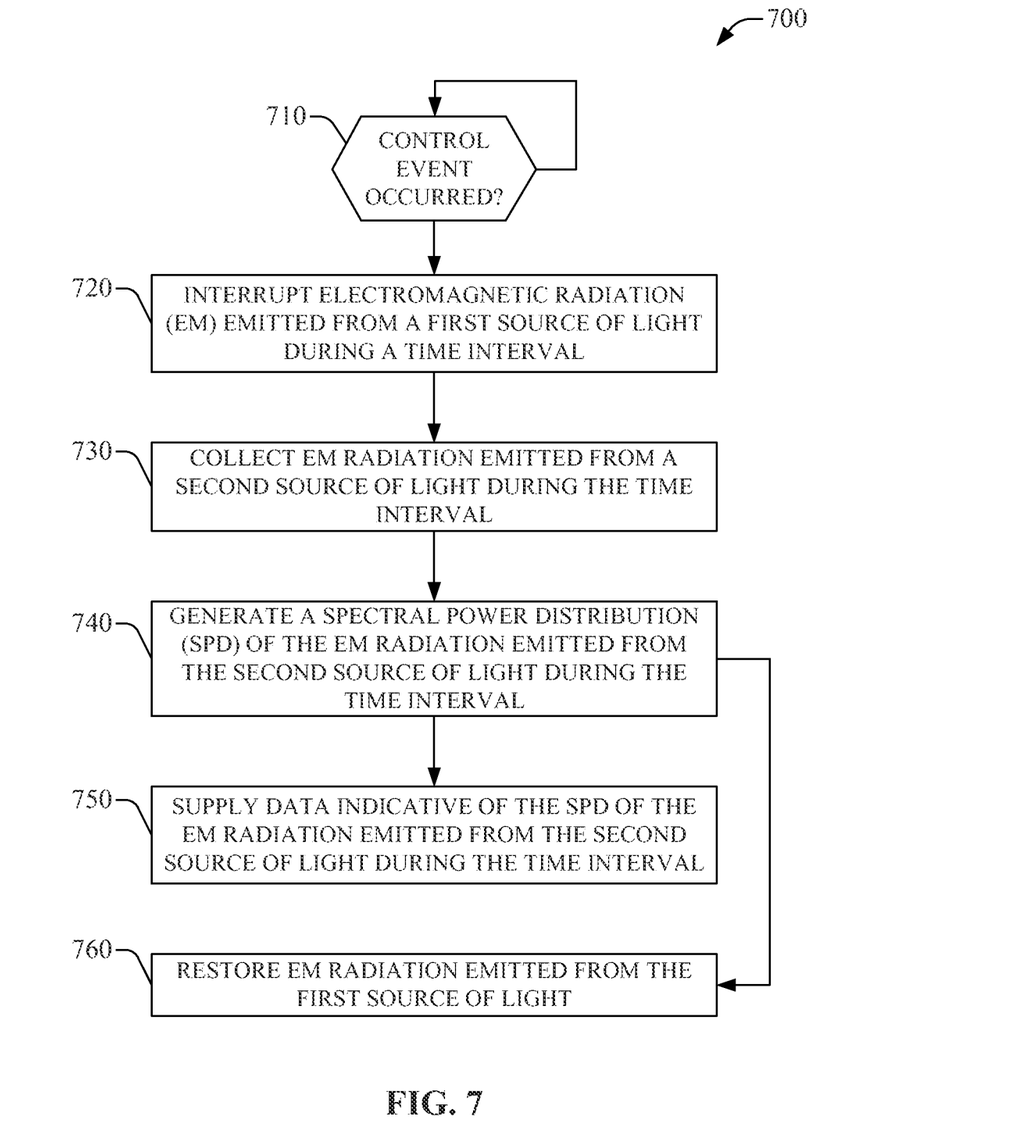

Control logic can be applied in a variety of modalities and related embodiments of methods and systems enabling such methods. FIGS. 5-7 illustrate example of such variety of modalities; the example methods 500-700 depicted in FIGS. 5-7 can embody, at least in part, act 410 of example method 400. In certain embodiments, a controller component (or controller), such as QA controller 148, or one or more components therein can implement the example methods 500-700.

FIG. 5 presents a flowchart of an example method 500 for applying control logic for dynamically controlling quality of illumination of an object according to aspects described herein. At act 510, a first spectral power distribution (SPD) of EM radiation emitted from a first source of light (e.g., the active light source) is acquired. At act 520, a second SPD of EM radiation emitted from a second source of light (e.g., reference light source) is acquired. At act 530, the first SPD of the EM radiation emitted from the first source of light is compared with the second SPD of EM radiation emitted from the second source of light. At act 540, based on an outcome of the comparison, generate a metric indicative of spectral mismatch amongst the first SPD and the second SPD. At act 550, it is determined is value of the metric is adequate. Adequacy of such value can be determined by comparing the value with a predetermined threshold: For example, a comparison that indicates the value of the metric is smaller than the predetermined threshold can determine such value is adequate. In the alternative, a comparison that indicates the value of the metric is greater than or equal to the predetermined threshold can determine such value is adequate. In a scenario in which the determining conveys the value of the metric is adequate, at least the first SPD is supplied at act 560. In an alternative scenario, in response to determining that the value of the metric is inadequate, at least one control parameter of the first source is adjusted to achieve an adequate value of the metric at act 570. Flow is directed to 520, in which EM radiation emitted from the second source of light and to act 580, in which the at least one control parameter is supplied.

FIGS. 6-7 present flowcharts of example methods 600 and 700 for collecting information related to spectral features of a source of light according to aspects described herein. Regarding example method 600, at act 610, it is determined if a control event has occurred. In response to determining that the control event has not occurred, act 610 is re-enacted. In the alternative, in response to determining that the control event has occurred, EM radiation emitted from the source of light is collected at act 620. In an aspect, the control event can be configured, or defined, as part of configuring the control logic for illumination quality assurance that is applied in act 410. In an aspect, the control event can be initiation of acceptance phase of a profile of a SSL source (e.g., a SSL source of the group of the one or more SSL source(s) 120). The source of light can be the active light source referred to in example method 400. At act 630, a SPD of the EM radiation emitted from the source of light is generated and, at act 640, such SPD is supplied. Supplying the SPD of the EM radiation emitted from the source of light includes retaining the SPD in a memory (e.g., memory element 378 in memory 370).

In connection with example method 700, at act 710, it is determined if a control event has occurred. In response to determining that the control event has not occurred, act 710 is re-enacted. In the alternative, in response to determining that the control event has occurred, EM radiation emitted from a first source of light (e.g., the active light source referred to in example method 400) is interrupted during a time interval. Interrupting such EM radiation can include actuating a shutter to cause an aperture of a spectrometer to close and thus prevent collection of the EM radiation in light analysis optics (e.g., spectroscopic analyzer 144). In addition, interrupting the EM radiation emitted from the first source of light can include powering off, or de-energizing, the first source of light to cease emission of such EM radiation. As described in previous passages of the subject disclosure, in an aspect, the control event can be initiation of acceptance phase of a profile of a SSL source (e.g., a SSL source of the group of the one or more SSL source(s) 120).

At act 730, EM radiation emitted from a second source of light is acquired during the time interval and, at act 740, a SPD of such EM radiation is generated. At act 740, a SPD of the EM radiation emitted from the second source of light during the time interval is generated. At act 750, data indicative of the SPD of the EM radiation emitted from the second source of light during the time interval is supplied. At act 760, EM radiation emitted from the first source of light is restored.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, several microprocessors, one or more microprocessors in conjunction with a DSP core, or any other such configuration. Additionally, at least one processor may include, without being limited to including, one or more modules operable to or configured to perform one or more of the steps or acts described above.

Further, the steps or acts of a method or algorithm described in connection with the aspects disclosed herein may be embodied directly in hardware; in a software module executed by a processor; or in a combination of the two, such as in a firmware module. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in display equipment. In the alternative, the processor and the storage medium may reside as discrete components, e.g., chipsets, in display equipment. Additionally, in some aspects, the steps or acts of a method or algorithm may reside as one or any combination or set of codes or instructions on a machine-readable medium or computer-readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium or machine-readable medium. Computer-readable media machine-readable media includes both computer storage media and communication media including any medium that facilitates transfer of a computer program from one place to another. A storage medium may be any available media that can be accessed by a computer. By way of example, and not limitation, such computer-readable media can include, without being limited to including, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above also are included within the scope of computer-readable media.

What is claimed is:

1. A method, comprising:
    acquiring a first set of data indicative of electromagnetic (EM) radiation emitted from a first light source, and a second set of data indicative of EM radiation emitted from a second light source, wherein the first light source includes a group of solid-state light (SSL) sources; and
    issuing a profile for the first light source based on the data, wherein the profile includes at least one parameter that causes, at least in part, the first light source to emit EM radiation with a first spectral power distribution (SPD) that nearly matches a second SPD of the EM radiation emitted from the second light source.

2. The method of claim 1, further comprising:
acquiring the first SPD of EM radiation from the first set of data; and
acquiring the second SPD of EM radiation from the second set of data.

3. The method of claim 2, further comprising:
comparing the first SPD with the second SPD; and
based on outcome of the comparing, generating a metric indicative of spectral mismatch amongst the first SPD and the second SPD.

4. The method of claim 3, further comprising:
for a value of the metric that does not fulfill at least one suitability criterion, adjusting at least one control parameter of the first light source for achieving a suitable value of the metric.

5. The method of claim 4, further comprising:
supplying the at least one control parameter to a controller of the first light source.

6. The method of claim 2, wherein acquiring the first SPD of the EM radiation emitted from the first set of data includes:
collecting the EM radiation from the first light source in response to occurrence of a control event; and
generating the first SPD from the EM radiation.

7. The method of claim 2, wherein acquiring the second SPD of the EM radiation emitted from the second set of data includes:
interrupting the EM radiation emitted from the first light source for a time interval in response to a control event;
collecting the EM radiation emitted from the second light source; and
generating the second SPD of the EM radiation emitted from the second light source during the time interval.

8. The method of claim 2, wherein acquiring the second SPD of the EM radiation emitted from the second set of data includes:
extracting the second SPD from data storage.

9. An apparatus, comprising:
a monitor component that acquires a first set of data indicative of electromagnetic (EM) radiation emitted from a first light source, and a second set of data indicative of EM radiation emitted from a second light source, wherein the first light source includes a group of solid-state light (SSL) sources; and
an adjustment component that issues a profile for the first light source based at least on the first set of data and the second set of data, wherein the profile includes at least one parameter that causes, at least in part, the first light source to emit EM radiation with a first spectral power distribution (SPD) that nearly matches a second SPD of the EM radiation emitted from the second light source.

10. The apparatus of claim 9, wherein the adjustment component retains the profile in a memory functionally coupled to the apparatus, and wherein the at least one parameter in the profile includes:
a first parameter indicative of actuation condition of a SSL source in the group of SSL sources, wherein the actuation condition is an energized condition or a de-energized condition; and
a second parameter indicative of intensity of EM radiation to be emitted from the SSL source in a spectral channel when the actuation condition is the energized condition.

11. The apparatus of claim 9, wherein based at least on outcome of a comparison of the first SPD with the second SPD, the monitor component determines a value of a metric representative of spectral mismatch amongst the first SPD and the second SPD.

12. The apparatus of claim 11, wherein the adjustment component issues the profile for the first light source based at least on the value of the metric.

13. The apparatus of claim 9, wherein the monitor component performs the following:
generates the first SPD based at least on the first set of data; and
generates the second SPD based at least on the second set of data.

14. The apparatus of claim 9, wherein the monitor component acquires the first set of data and the second set of data from a spectroscopic analyzer comprising a first photodetector and a second photodetector integrated in a device, wherein the first photodetector is located within about 1 micrometer to about 100 micrometers from the second photodetector.

15. The apparatus of claim 9, wherein the monitor component acquires the second set of data from data storage.

16. The apparatus of claim 9, further comprising a mode driver component that causes the apparatus to interrupt emission of EM radiation from the first light source during a predetermined period.

17. The apparatus of claim 16, wherein the monitor component performs the following:
acquires the second set of data during the predetermined period; and
generates the second SPD based at least on the second set of data.

18. A system, comprising:
a spectroscopic analyzer that collects electromagnetic (EM) radiation substantially emitted from a first light source and EM radiation substantially emitted from a second light source wherein the first light source includes a group of solid-state light sources; and
a quality assurance controller that supplies a configuration of the first source of light, in response to implementation of the configuration, the first source of light emits EM radiation with a first spectral power distribution (SPD) that nearly matches a second SPD of the EM radiation substantially emitted from the second light source.

19. The system of claim 18, further comprising a light source controller that implements the configuration of the first source of light.

20. The system of claim 18, wherein the group of solid-state light sources includes one or more of at least one conventional light emitting diode (LED), or at least one organic LED, or at least one quantum-dot-based LED.

21. The system of claim 18, wherein the spectroscopic analyzer includes:
a set of optics comprising:
at least two aperture stops coupled to at least two light collection conduits; and
a miniature spectrometer; and
a light sensor integrated into the set of optics through a slab of material that is effectively opaque to the EM radiation emitted from the first light source and the EM radiation substantially emitted from the second light source.

22. The system of claim 21, wherein the sensor includes:
a first semiconductor photodetector integrated in a substrate, wherein the first semiconductor photodetector comprising a first set of pixels spanning a first confined region in the substrate; and
a second semiconductor photodetector integrated in the substrate, wherein the second semiconductor photodetector includes a second set of pixels substantially the same as the first set of pixels, the second set of pixels spanning a second confined region in the substrate, wherein the second confined region covers a surface substantially the same as the surface covered by the first confined region.

23. The system of claim 22, wherein the first semiconductor photodetector is located within about 1 micrometer to about 100 micrometers from the second semiconductor photodetector.

* * * * *